INVENTORS
J. N. SCOTT, JR.
FRED HICKS
D. L. PETERS
BY Young & Quigg
ATTORNEYS

United States Patent Office 3,246,062
Patented Apr. 12, 1966

3,246,062
EXTRUSION BLOW MOLDING
John N. Scott, Jr., Fred Hicks, and Donald L. Peters, Bartlesville, Okla., assignors to Phillips Petroleum Company, a corporation of Delaware
Filed Mar. 23, 1962, Ser. No. 181,879
10 Claims. (Cl. 264—98)

This invention relates to the molding of plastics. More specifically, it relates to a method for blow molding a plastic material. In one aspect, this invention relates to a method for circulating a coolant through a plastic containing mold. Another aspect of this invention relates to a method for introducing to and exhausting a coolant from a plastic containing mold. In another aspect, this invention relates to a method of cooling a molded plastic object by providing a novel means for introducing coolant to and exhausting from a plastic containing mold. A still further aspect of this invention is to provide a method of molding which will allow an atomized coolant to be blown through the molded object without loss of heat in same. A still further aspect of this invention relates to the provision of a method of molding wherein means are provided for circulating coolant through the molded item such that no heat loss is experienced in the mandrel of same.

The process of forming articles, particularly hollow blown articles, such as bottles, from plastic materials which are thermoplastic, hard at normal temperatures and rendered plastic and moldable under elevated temperatures and pressures, particularly organic plastic materials such as polyethylene, polypropylene, poly-1-olefins, copolymers, polystyrene, polyvinylchlorides, etc., comprises first the bringing of the material to a plastic and moldable condition. For this purpose, when using most thermoplastic materials, the material in a comminuted form is subjected simultaneously to heat and pressure. In the present instance, the means shown for accomplishing this purpose can be any plasticating means, such as an extruder or injection molding machine, having a parison extrusion die directly communicating therewith. In addition, materials capable of wet extrusion may be employed in the process of this invention, since they can be dried to evaporate the solvent and cooled by the method as herein disclosed.

A commercially useful process to which the instant invention is applicable comprises rendering the plastic material molten by an injection molding machine. Such plastication is obtained by forcing the plastic material by a ram through a heated cylinder having a torpedo centered therein. The molten material is fed from the injection nozzle to the parison extrusion die and the parison is extruded from said die by the force exerted by said ram. When an extruder is used as the plasticating means, the force supplied by the extruder screw is utilized to extrude the parison from the die. When using an extruder, one method of continuous operation of same is maintained by the use of at least two parison dies being fed alternately from the extruder. A less used method utilizes an extruder feeding molten plastic material to a reservoir chamber, wherein a piston intermittently forces material therefrom through a parison extrusion die. The invention is also applicable to another technique in which continuous extrusion is achieved by passing multiple molds beneath the extrusion head, picking up the parison and employing needle blowing of same.

The parison is extruded downward from the die, the mold closes around the parison, sealing together the lower end of the parison by clamping same together. The parison is expanded by positive pressure to the shape of the mold. After the article has taken shape and the mold is opened, the article is severed from the parent material at the die.

In carrying out the above process, the thermoplastic material is introduced for molding into a cooled mold and blown therein to the shape of the article. After the plastic is cooled and rigid the mold is opened and the article is removed. Copending application S.N. 102,243 filed April 11, 1961, now Patent No. 3,127,458 describes a method for the internal cooling of blow molded objects by circulating a coolant through the item after sufficient pressure has been developed. The circulating coolant is exhausted through the same mandrel which served to introduce same into the mold. The exhaust conduit is in the extrusion mandrel. Temperature control of this heated extrusion mandrel is achieved by providing an air gap along the exhaust conduit in the extrusion mandrel. This air gapping was practical as long as the extrusion mandrel being used was of sufficient diameter to accommodate the requisite conduits along with the air gap. However, when a small diameter mandrel was required difficulty was encountered in providing the requisite flow of coolant under sufficient pressure to obtain a satisfactory object from the molding operation. Thus the technique is essentially limited to operations which utilize large blow molding parts.

We have now found that it is possible to employ the internal cooling principle by providing means to exhaust air and/or air-water mixture or other coolants without passing the exhausting fluids through the blowing mandrel. The production rate of blow mold items is increased by improving the efficiency of the cooling cycle by constructing the blowing mandrel with an air inlet conduit and an air outlet conduit which allows the coolant to exhaust through the side of the mold rather than through the blowing mandrel upon reaching a desired preset pressure which is sufficient to provide a complete expansion of the parison.

Therefore, an object of the present invention is to provide a method of improving the efficiency of the cooling cycle of blown molded items.

Another object of this invention is to provide a reduction in the required cooling time so as to yield an increase in the production rate of the desired items.

Another object of this invention is to provide a method for obtaining sufficient blowing pressure when utilizing mandrels having a small diameter.

Another object of this invention is to provide a method for blow molding plastic objects without any appreciable cooling of the mandrel being employed.

A still further object of this invention is to provide a method of admitting the blowing and cooling fluids to a mold.

Other aspects, objects and the several advantages of the invention are apparent from a study of this disclosure, the drawings and the appended claims.

Thus, according to this invention, there is provided a method for use in the manufacture of blown hollow articles from organic plastic materials which are expandible by blowing and thereafter capable of being rigidified. Such a method increases the production rate of such plastic materials by reducing the in-mold cooling time ordinarily required in the extrusion of such materials and avoiding heat loss in the mandrel.

Figures 1, 3:
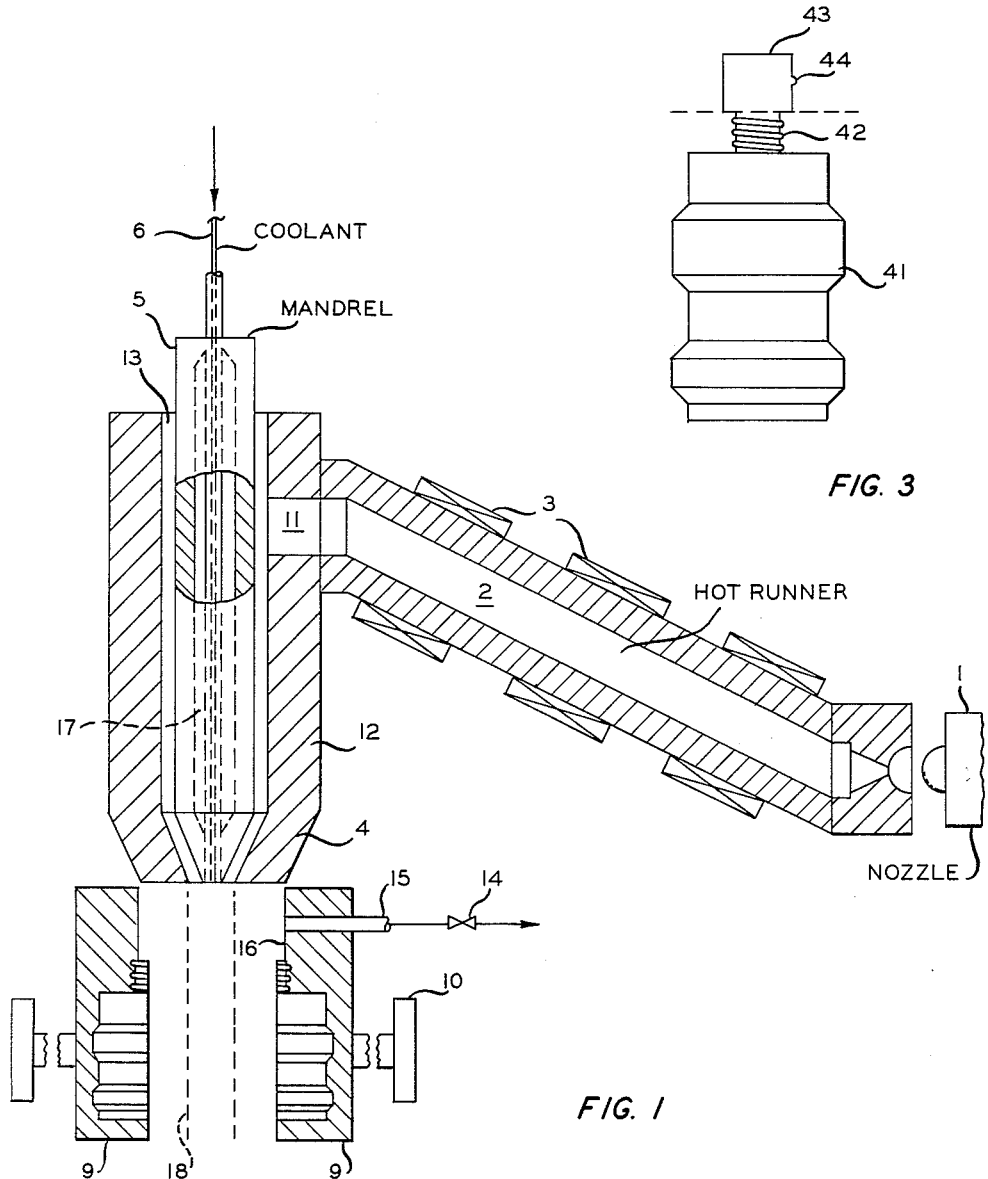
FIGURE 1 is a sectional view of the blow molding system of this invention.
FIGURE 3 shows the complete molded object.

Referring now to FIGURE 1, molten polymer is fed from a plasticating means such as an extruder or injection molding machine, not shown, to nozzle 1 which communicates with hot runner 2 encircle by heater bands 3. Molten polymer is fed from the hot runner 2 to parison die 4 through conduit 11. The parison die comprises cylindrical housing member 12, having mandrel 5 disposed therein to form annular 13. Conduit 6 is concentrically positioned in mandrel 5 and insulated by means of air gap 17. Mold halves 9 operated by air cylinders 10 close around parison 18 extruded from annular area 13. Exhaust pressure relief valve 14 is provided in conduit 15 so as to allow the mold to be exhausted at a predetermined pressure. Conduit 15 is so provided as to protrude slightly into the area 16 of mold 9. Mold halves 9 are provided with an indented area 16 which serves to provide an area of the molded object through which the mold can be exhausted. This portion of the molded object is then removed upon completion of the molding cycle.

Figure 2:
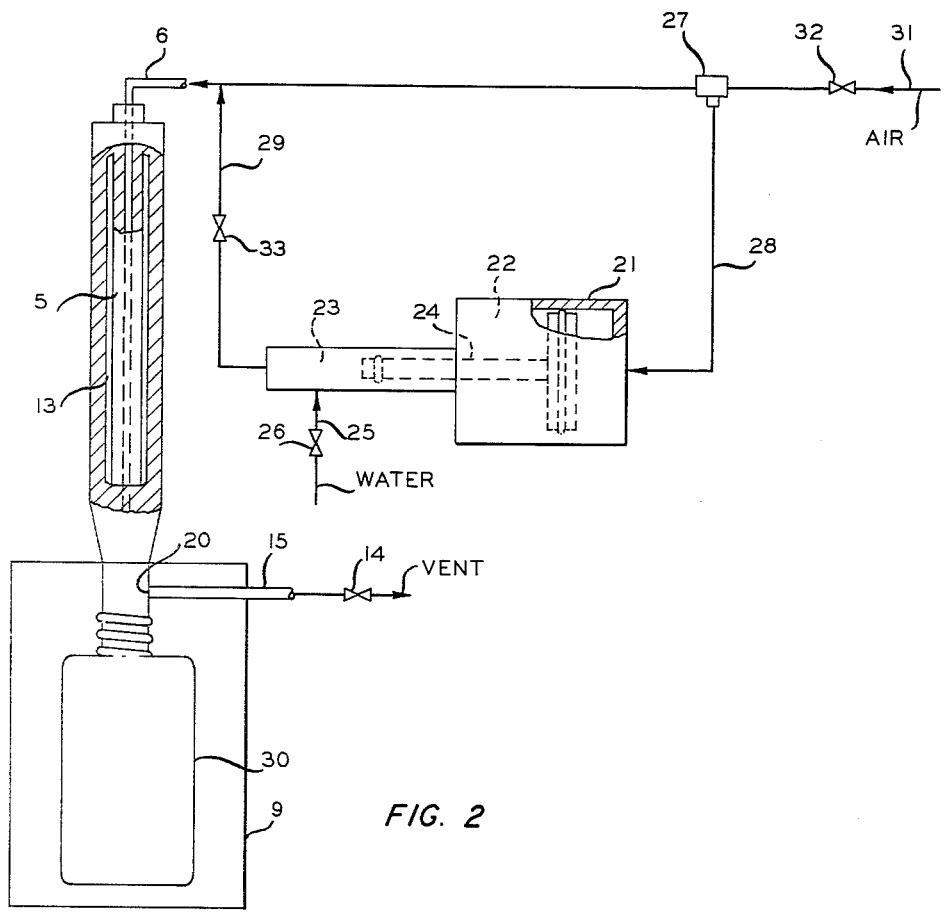
FIGURE 2 is a sectional view of the mandrel showing the air and coolant circulating means.

In FIGURE 2, mandrel 5 is shown in communication with mold 9. Air from a source not shown travels through conduit 31 communicating with conduit 6. Directional valve 32 in conduit 31 regulates the flow of air in relation to the forming cycle. Air travels through conduits 31 and 6 into bottle 30 and then through an exhaust hole 20 blown in the side of the molded bottle at conduit 15 and then through valve 14. Coolant injector mechanism 21 comprises chambers 22 and 23. Piston 24 is positioned in chambers 22 and 23. Coolant enters chamber 23 through check valve 26 and conduit 25. Air from conduit 31 enters chamber 22 through T 27 and conduit 28. Coolant is removed from chamber 23 via conduit 29 through relief valve 33 and travels through conduit 6, bottle 30 and exhaust hole 20.

In operation, when the air supply is shut off coolant fills chamber 23 and pushes piston 24 further into chamber 22. When the air is supplied and sufficient pressure is created on piston 24 to increase the pressure of the coolant in chamber 23 greater than that set on relief valve 33, relief valve 33 opens and allows the coolant to flow through the bottle as mist in the air. Check valve 26 prevents the coolant pressured in chamber 23 from backing into conduit 25. Relief valve 33 is preset to open approximately simultaneously with the opening of relief valve 14.

High blow pressure may be utilized to rapidly force air into the parison without ever actually developing this pressure in the mold. Thus, relief valve 14 is set to exhaust at a relatively low pressure. The rapid blow is important in the obtaining of a good smooth surface.

Chamber 23 may be provided with a liquid volume adjustment means. This means comprises a rod that is adjustably inserted in the coolant chamber 23 to control the volume of coolant in same.

As shown in FIGURE 3, the molded object 41 as taken from the mold has the desired neck portion 42 and an upper area of plastic 43 which will be subsequently removed. The upper area of plastic 43 is formed in the indented area 16 as shown in FIGURE 1. This is so provided that the air and coolant used in forming the object can be blown through the side of same and exhausted through conduit 15. The pressure of the coolant and blowing medium serve to rupture the side of the blown object to form the outlet 44 through which the fluid is then exhausted. After removal from the mold, the upper zone 43 is severed from the remainder of the desired blow molded object.

The protrusion of conduit 15 into indented area 16 of the mold 9 is desirable to assure appropriate rupture of the molded item at this point so as to allow the desired exhausting of coolant from the molded item at the end of the cooling cycle.

The following examples are provided to further illustrate the present invention.

*Example I*

A 22-ounce capacity bottle weighing 42.5 grams was molded with a stock temperature of 430° F., a mold temperature of 80° F., and a blowing pressure of 60 p.s.i. To provide the necessary cooling, the pressure was held until the bottle had cooled to 240° F. in the neck section. This temperature was determined by the use of a neck temperature needle pyrometer. By the use of this standard technique with no air being circulated, a 10-second blowing time was required.

*Example II*

The same process as that of Example I is carried out but providing therein a relief valve on the mold preset at 60 p.s.i. so that 60 p.s.i. air is circulated through the mold and with the additional modification that 5.3 grams of water are atomized into the circulating air through the bottle approximately 0.5 second after blowing started and stopped approximately 2.5 seconds before termination of the blowing time and exhausted at the neck area. By the use of this technique, a 6-second blowing time was required to achieve a neck temperature of 240° F.

Reasonable variations and modifications can be made within the scope of the present invention, the essence of which is that there is provided a method for blow molding utilizing means for extruding said plastic material, conduit means for introducing circulating fluid at superatmospheric pressure within the extruded plastic material to expand same by blowing, molding means cooperating with said extruding means which receive and form the extruded material, and exhausting means which is so adapted as to allow passage of the circulating fluid through a portion of the blown hollow article.

We claim:
1. A method of producing a blown hollow article from an organic plastic material comprising the steps of:
 (a) extruding a mass of plastic material to form a parison in the shape of a tube;
 (b) introducing a fluid into said parison to expand said parison into conformity with the interior surface of an enclosing mold, and to rupture said parison to form an opening therein;
 (c) circulating said fluid through said parison and said opening after achieving a predetermined fluid pressure within said parison; and
 (d) admixing a liquid coolant with said circulating fluid to cool said parison to a temperature at which said plastic material becomes rigid.

2. A method according to claim 1 wherein said liquid coolant is water.

3. In a method of producing a hollow article from an organic plastic material including the steps of extruding a mass of plastic material to form a parison in the shape of a tube, introducing a fluid into said parison to expand said parison into engagement with the interior surface of an enclosing mold, and cooling said parison until said plastic material becomes rigid, the improvement comprising:
 (a) rupturing said parison to form an opening therein when said parison engages the interior surface of said mold; and
 (b) circulating said fluid through said parison and said opening to cool said parison to a temperature at which said plastic material becomes rigid.

4. A method according to claim 3 wherein said fluid is air.

5. A method according to claim 3 wherein said fluid includes a mixture of air and water.

6. A method according to claim 3 wherein said fluid is introduced into said parison at a pressure higher than the pressure at which said fluid passes through said opening.

7. A method of blow molding comprising the steps of:
 (a) positioning a tubular-shaped parison of plastic material within a mold;
 (b) introducing a fluid into said parison to expand said parison into conformity with the interior surface of the mold, and to rupture said parison to form an opening therein; and (c) circulating said fluid through said parison and said opening to cool said parison to a temperature at which said plastic material becomes rigid.

8. A method according to claim 7 wherein a liquid coolant is admixed with said circulating fluid.

9. A method of blow molding an organic thermoplastic material to form a hollow article comprising the steps of:
   (a) forming a tubular-shaped parison of plastic material within a mold;
   (b) introducing a fluid into said parison to expand said parison into conformity with the interior surface of the mold, and to rupture said parison to form an opening therein;
   (c) circulating said fluid through said parison and said opening after achieving a predetermined fluid pressure within said parison;
   (d) admixing a liquid coolant with said circulating fluid to cool said parison to a temperature at which said plastic material becomes rigid; and
   (e) removing the formed hollow article from the mold.

10. A method according to claim 9 wherein said liquid coolant is water.

References Cited by the Examiner

UNITED STATES PATENTS

| | | | |
|---|---|---|---|
| 2,348,738 | 5/1944 | Hofmann | 18—55 |
| 2,401,564 | 6/1946 | Hofmann | 18—5 |
| 2,783,503 | 3/1957 | Sherman | 18—55 |
| 2,789,934 | 4/1957 | Busbach | 264—269 |
| 2,943,348 | 7/1960 | Mumford et al. | 18—5 |
| 2,975,473 | 3/1961 | Hagen et al. | 264—99 |
| 3,127,458 | 3/1964 | Scott et al. | 264—98 |

ROBERT F. WHITE, *Primary Examiner.*

MICHAEL V. BRINDISI, *Examiner.*